US010602592B2

(12) United States Patent
Elliot et al.

(10) Patent No.: US 10,602,592 B2
(45) Date of Patent: Mar. 24, 2020

(54) RETROFIT SMART HOME CONTROLLER DEVICE WITH POWER SUPPLY MODULE, CHARGER AND DOCK

(71) Applicant: Kleverness Incorporated, Walnut, CA (US)

(72) Inventors: Dan Nurko Elliot, Naucalpan de Juarez (MX); Gerardo Gomez Soto, Tequisistlan Tezoyuca (MX); Carlos Mucino Ramirez, Alvaro Obregon (MX); Edmundo Leyva Rios, Iztapalapa (MX); Diego Lezama, Azcapotzalco (MX); Jorge Ivan Ramirez Lira, Miguel Hidalgo (MX)

(73) Assignee: KLEVERNESS INCORPORATED, Walnut, CA (US)

( * ) Notice: Subject to any disclaimer, the term of this patent is extended or adjusted under 35 U.S.C. 154(b) by 0 days.

(21) Appl. No.: 16/448,705

(22) Filed: Jun. 21, 2019

(65) Prior Publication Data
US 2019/0394863 A1      Dec. 26, 2019

Related U.S. Application Data

(60) Provisional application No. 62/688,865, filed on Jun. 22, 2018.

(51) Int. Cl.
*H05B 37/02* (2006.01)
*H02J 7/00* (2006.01)
*H05B 33/08* (2020.01)

(52) U.S. Cl.
CPC ........ *H05B 37/0272* (2013.01); *H02J 7/0052* (2013.01); *H05B 33/089* (2013.01);
(Continued)

(58) Field of Classification Search
CPC ............ H05B 37/0272; H05B 37/0245; Y10T 307/359
(Continued)

(56) References Cited

U.S. PATENT DOCUMENTS 4,633,141 A    12/1986   Weber
6,751,522 B2    6/2004   Okadaa et al.
(Continued)

OTHER PUBLICATIONS

International Search Report for PCT/US2019/038643 dated Sep. 12, 2019 (3 pages).
(Continued)

*Primary Examiner* — Thuy V Tran
(74) *Attorney, Agent, or Firm* — Shumaker, Loop & Kendrick, LLP (57) ABSTRACT

A smart home controller device for controlling a lighting device, which operates with two wires of an electrical installation and is installed in a standard electrical box and includes a first low power module, a charger module, a second low power module, a high power module and a wireless controller. The first low power module is used when the lighting device is a smart lighting device, and energizes the charger module, which provides power to a battery of the wireless controller. The wireless controller wirelessly sends and receives signals from the smart lighting device to control its operation and monitor its status. The second low power module is used when the lighting device is a conventional lighting device and provides power to the wireless controller when the lighting device is ON. The high power module is used to control the switching ON, OFF and dimming of the conventional lighting device.

25 Claims, 7 Drawing Sheets

(52) U.S. Cl.
CPC ..... *H05B 33/0842* (2013.01); *H05B 37/0236* (2013.01); *H05B 37/0245* (2013.01); *Y10T 307/359* (2015.04)

(58) Field of Classification Search
USPC ................... 340/521; 323/318; 315/175, 178
See application file for complete search history.

(56) References Cited

U.S. PATENT DOCUMENTS

| | | | |
|---|---|---|---|
| 6,993,289 B2 | 1/2006 | Janik | |
| 8,994,276 B2 | 3/2015 | Recker et al. | |
| 9,208,676 B2 | 12/2015 | Fadell et al. | |
| 9,510,426 B2 * | 11/2016 | Chemel | H05B 33/0854 |
| 9,717,132 B2 | 7/2017 | Sun et al. | |
| 9,980,352 B2 | 5/2018 | Davis et al. | |
| 10,201,064 B1 | 2/2019 | Soto et al. | |
| 10,201,765 B2 | 2/2019 | Alzner et al. | |
| 2003/0083758 A1 | 5/2003 | Williamson | |
| 2011/0073743 A1 | 3/2011 | Shamie | |
| 2012/0185801 A1 | 7/2012 | Madonna et al. | |
| 2013/0342131 A1 * | 12/2013 | Recker | H05B 33/0842 315/292 |
| 2014/0184083 A1 * | 7/2014 | Pelton | H05B 37/0245 315/152 |
| 2016/0284176 A1 | 9/2016 | Harrington et al. | |

OTHER PUBLICATIONS

Written Opinion for PCT/US2019/038643 dated Sep. 12, 2019 (10 pages).

* cited by examiner

RETROFIT SMART HOME CONTROLLER DEVICE WITH POWER SUPPLY MODULE, CHARGER AND DOCK

TECHNICAL FIELD

The present application is related to the technical field of Retrofitting & wireless technology, more specifically, a retrofit smart home controller device including a power supply, charger and dock.

BACKGROUND

The present invention aims to solve the problem that arises when it is desired to automate the systems of a house such as lighting, HVAC or entertainment, and it is necessary to modify the electrical installation to install a smart home controller device to meet their needs of power. For example, if a user wants to install an LCD-type touch-screen controller to control a smart bulb of his Smart home, rewiring of the entire house would be needed to supply AC or DC power to the screen if there is no power outlet nearby, which represents an economic problem and a time-consuming process. The present invention proposes solution by means of an electronic circuit that may be installed by replacing a common wall switch that only has two wires without the need to have the neutral wire, such as occurs in a conventional light switch. This circuit will have the necessary size to fit in the space occupied by the previous switch inside the electrical box or wall box. The circuit contains a docking station in its front, which can receive and power different types of controllers for smart devices for home automation applications like a smart bulb or a smart security system. The electronic circuit is also able to control a conventional light bulb by constantly drawing energy from the electrical installation by letting a small current pass through the conventional light bulb, which should be small enough to not let the light bulb illuminate. The wireless controllers of the smart home controller device are able to talk to the Smart home via Wi-Fi, Zigbee, Zwave, Nordic, Bluetooth or any other type of communication. Also, these wireless controllers are removable so they can be used anywhere in the house. When the wireless controllers need to recharge their internal battery, they must return to the docking station to recharge.

The present invention also aims to solve a problem presented by all the smart bulbs that contain the control and communication electronics integrated in the same smart bulb. These smart bulbs require energy 24 hours a day to be remotely controlled through wireless communication. By implementing a smart bulb with a normal switch, the current flow is completely interrupted when the switch is open, and current flow to the smart bulb is allowed when the switch is closed. The problem arises when a user turns off the switch and interrupts the power supply to the smart bulb. When this happens, the smart bulb runs out of power, which prevents it from listening to wireless signals that allow the smart bulb to be activated remotely, for example, through a mobile application. Consequently, smart bulbs can only be controlled remotely, by means of an application, or with the physical switch connected to the electrical installation. That is, smart bulbs can not be controlled in both ways at the same time; if the user turns off the wall switch, the smart bulb loses all its automation qualities until the user physically reactivates the switch on the wall. This is a great inconvenience for the user, specifically when he wants to control his smart bulbs remotely, since it is not possible to do it if the switch cuts the current of the smart bulb completely.

All smart home controller devices in the market implementing an LCD touch screen require a neutral wire in the electrical installation in addition to the hot or live wire to operate. Additionally, some of these smart controller devices require an Ethernet (UTP) wire to operate properly. This generates a serious wiring problem when the house is already built. Consequently, if a user wants to install on the wall some type of smart home controller device that is able to recharge the wireless controller's battery, modifications to the electrical wiring of the house are generally required.

Most smart bulbs in the market work with a Wi-Fi module or through a Zwave/Zigbee radio module integrated in the bulb. In the case of a Wi-Fi bulb, it communicates directly with the Internet Router and in the case of a Zwave/Zigbee bulb, it communicates with a central control hub that acts as a bridge between the smart bulb and the internet.

Currently there are several types of wireless controllers for smart bulbs in the prior art which are button boards with wireless communication that communicate with a central module. These button boards contain a small battery or contain a mechanism that generates electrical energy from the motion when pressing the button. They have limited functionality though, since they are not rechargeable and once the battery runs out, they must be replaced or the button board will stop working and the only way to control the smart bulb would be through the mobile app. It should be mentioned that there are not implementations that control smart bulbs with an improved interface such as a LED screen, since the current consumption in these wireless controllers (button boards with wireless communication) is incredibly limited. Therefore, if a person wants to install a wireless controller with an LCD interface or similar in a wall box or electrical box made for a conventional switch, he would have to change the wiring of the house and install a neutral wire to get enough power for the operation of the screen or even to set up a smart tablet in the wall and connect it to an electrical outlet, since the batteries of the current wireless controllers do not provide enough power for the operation of the touch LCD screen.

The technology described in the present application comprises a power supply, which partially exists in the prior art, such as that disclosed in U.S. Pat. No. 10,201,064 B1 belonging to the same Applicant known as KLEVERNESS INCORPORATED, wherein the differences will be described in the detailed description of the invention, that does not require a neutral wire to be able to draw power from an existing electrical grid and generate DC power for an electronic circuit. One of the embodiments of the present invention occurs when the power supply is connected to an electrical box in series with an incandescent bulb, wherein sufficient energy can be drawn from the line to power the electronic circuit while a relatively small current passes through the bulb. The current passing through the incandescent bulb is not enough to make the bulb light up due to its high impedance. Another embodiment is implemented when the lighting load connected to the smart home controller device is a low power bulb. In this case, the power supply is connected to a conventional LED or CFL bulb or even some smart bulbs, and it is necessary to use a snubber adapter connected in parallel with the bulb, since due to the low impedance of these bulbs it is possible that the current passing therethrough will make them light up. That is, a capacitor, resistance or even a smart snubber circuit, which already exists in the prior art, such as that disclosed in U.S. Pat. No. 10,021,765 B1 belonging to the same Applicant known as KLEVERNESS INCORPORATED, with electronic components is connected to the bulb to let a small current pass therethrough without the bulb having the blinking problem commonly called flicker, wherein the bulb flickers without control. It is worth mentioning that, in the case of smart bulbs, some smart bulbs work as a snubber adapter, since in order to operate, the electronic circuits therein allow the current to flow all the time through the smart light bulb itself, which allows the power supply to be powered in an uninterrupted way and thus eliminating the need for an external snubber adapter.

The smart home controller device is able to work with a three-wire connection, i.e., with the hot, neutral and load wires and thus the need for a snubber adapter is eliminated.

SUMMARY

The present invention is related to a smart home controller device which may be used to control different home automation systems and smart devices for automation applications of the smart home such as a smart lighting system, a smart security system, a smart air conditioning system, HVAC, etc.

The smart home controller device has a power supply that does not require a neutral wire to be able to draw power from an existing electrical grid and generate DC power for an electronic circuit. It may be installed by replacing a common wall switch that only has two wires without the need to have the neutral wire, such as occurs in a conventional light switch. Namely, smart home controller device can be installed in a standard electrical box, without the need to modify the electrical installation of the house.

The smart home controller device comprises a dock which includes the aforementioned power supply which, likewise, comprises at least a low power module, a high-power module and a charger module which supplies power to charge a battery of a wireless controller. The wireless controller of the smart home controller device may be via wireless power transmission or by contact, such as with electrical connectors. Such wireless controller, once charged, may be separated from the dock to control, wirelessly, home automation systems and smart devices found within the house.

Due to the aforementioned components, the power supply of the smart home controller is able to draw power from a smart, non-smart, incandescent, FCL or LED type bulb, uninterruptedly, regardless of whether the bulb is ON or OFF.

Further innovative objects, advantages and aspects of the invention should be evident throughout the following detailed description together with the accompanying drawings and ends accompanying the present invention.

BRIEF DESCRIPTION OF THE DRAWINGS

The invention may be better understood by referring to the following figures.

DETAILED DESCRIPTION

The present invention describes a smart home controller device that allows to control a variety of smart appliances and home automation systems of the smart home. For a smart lighting application, the smart home controller device is able to control either conventional or smart bulbs. A preferred embodiment of a smart home controller device for lighting applications will be described. To control a smart bulb, the smart home controller device energizes a wireless controller of the smart home controller device that can be installed in a standard electrical box by replacing a common wall switch, without the need to modify the electrical installation of the house. The smart home controller device receives only the phase or neutral wire and the wire from the lighting load or bulb, that is, it only requires two wires to operate and works in an indistinct manner connected to phase or neutral. The smart home controller device is also able to be installed in an electrical box with three wires (line, phase and load) or with both AC wires (hot and neutral). The fact that it is able to operate with two wires or three wires allows the smart home controller device to be installed in the totality of the existing electrical installations.

One of the embodiments of the present invention occurs when a power supply, included in smart home controller device, is connected to an electrical box in series with an incandescent bulb, wherein sufficient energy can be drawn from the line to power the electronic circuit of the power supply while a relatively small current passes through the incandescent bulb, when it is off. The current passing through the incandescent bulb is not enough to make the bulb light up due to its high impedance.

Another embodiment is implemented when the lighting load connected to the smart home controller device is a low power bulb. In this case, the power supply is connected to a conventional LED or CFL bulb or even some smart bulbs, and it is necessary to use a snubber adapter connected in parallel with the bulb, since due to the low impedance of these bulbs it is possible that the current passing therethrough will make them light up. That is, a capacitor, resistance or even a smart snubber circuit with electronic components is connected to the bulb to let a small current pass therethrough without the bulb having the blinking problem commonly called flicker, wherein the bulb flickers without control. It is worth mentioning that, in the case of smart bulbs, some smart bulbs work as a snubber adapter, since in order to operate, the electronic circuits therein allow the current to flow all the time through the light bulb itself, which allows the power supply to be powered in an uninterrupted way and thus eliminating the need for an external snubber adapter.

In preferred embodiment, the power supply of the smart home controller device is able to draw power from a smart bulb uninterruptedly, regardless of whether the smart bulb is ON or OFF. The smart home controller device will never cut off the power supplied to the smart bulb, thus eliminating the aforementioned problem in which the smart bulb loses its supply of power when turned OFF by means of a conventional wall switch. The smart home controller device allows the smart bulb to listen and receive information wirelessly at all times and can perform the functions of turning ON, OFF, dim and change color when receiving instructions from the central control hub or Wi-Fi router. The wireless controller of the smart home controller device allows the user to perform a physical action thereon to control the operation and monitor the status of the smart bulb. When said physical action is performed, the wireless controller will send a wireless signal to the central control hub or the internet router, in order to control the smart bulb. With this type of control, the smart home controller device never interrupts the flow of current to the smart bulb, allowing to control the smart bulb through an app, even if the smart home controller device remains in OFF state.

The smart home controller device generally comprises two main subsystems. The first one is a dock that will be installed on the electrical box by replacing a common wall switch and it contains a circuit that contains the power supply, previously mentioned, that also power a battery contained in the second subsystem. In one embodiment, the power supply is able to control up to three independent lighting loads as in a 3 gang switch. The second subsystem comprises the wireless controller compatible with the respective smart bulb and has a rechargeable battery and can be removed to operate remotely as a remote control.

Figure 1:
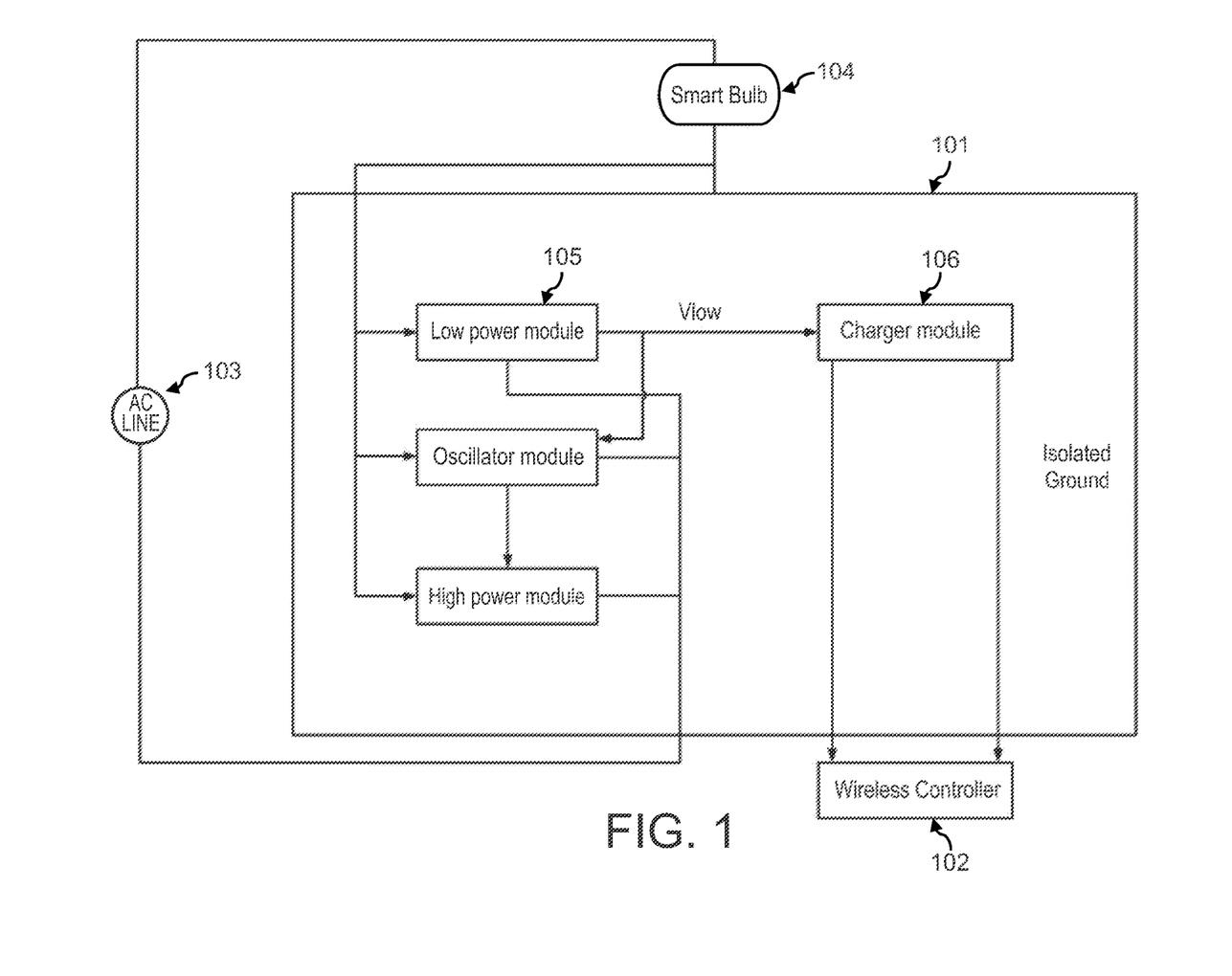
FIG. 1 is a block diagram depicting the functioning of a first embodiment of the smart home controller device.
Figure 2:
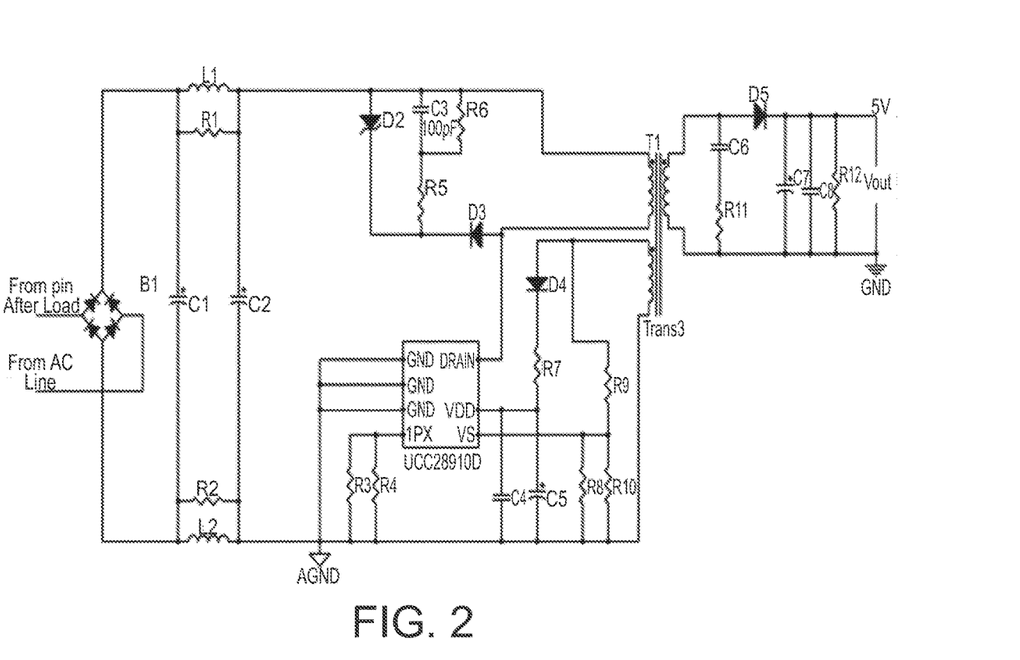
FIG. 2 is an electrical diagram of a preferred embodiment of the low power module implemented by means of a Flyback type converter.
Figure 3:
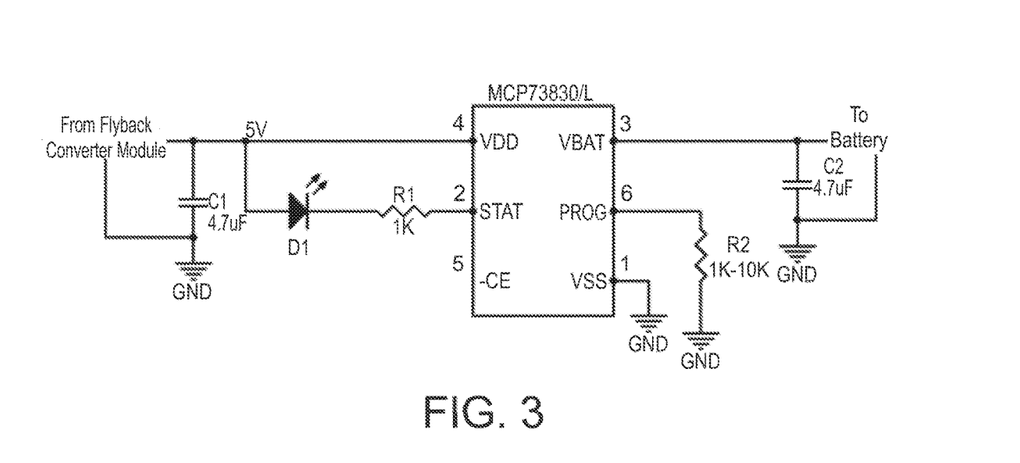
FIG. 3 is an electrical diagram of a preferred embodiment of the charger module.
Figure 4:
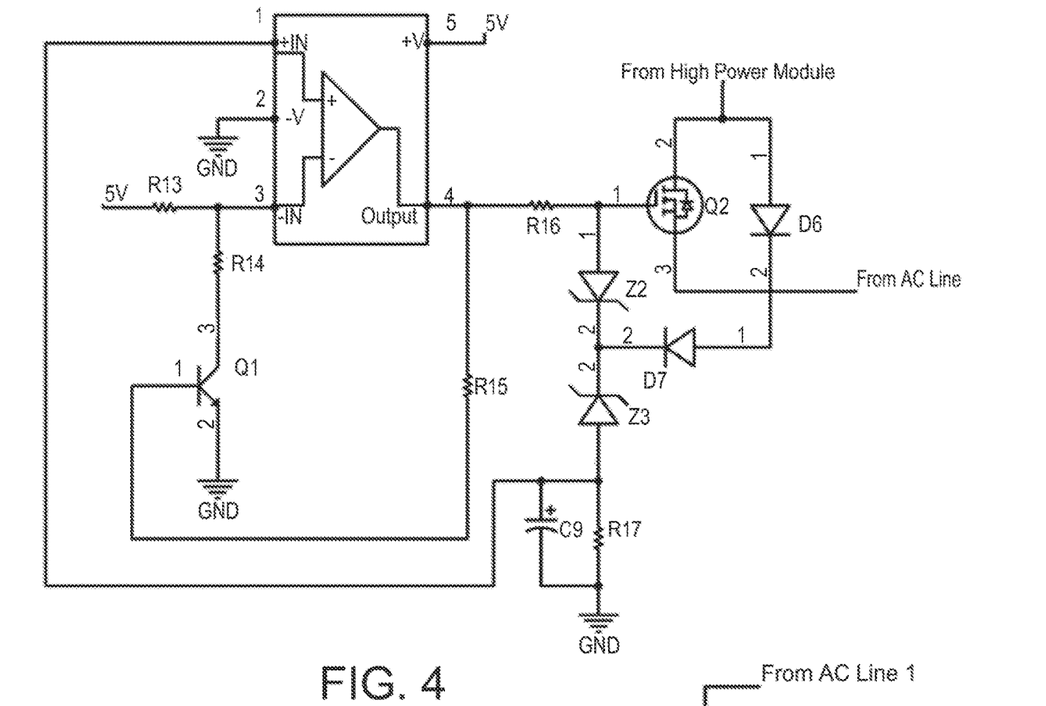
FIG. 4 is an electrical diagram of a preferred embodiment of the low power module comprising an oscillator.
Figure 5:
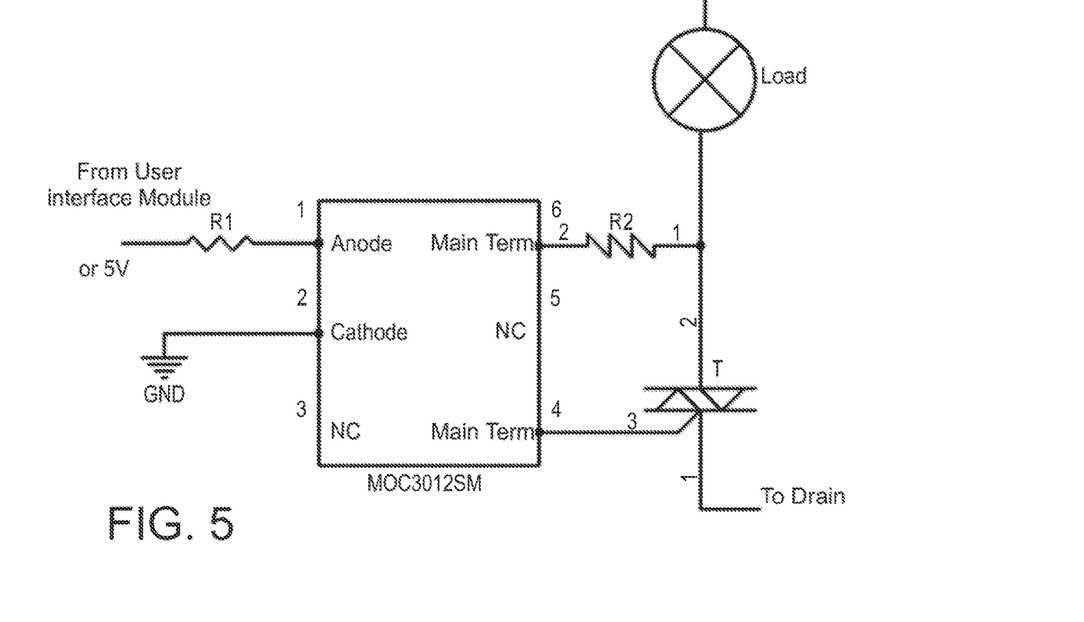
FIG. 5 is an electrical diagram of a preferred embodiment of the high-power module.

FIG. 1 shows a block diagram of the smart home controller device connected between the electrical installation of the house 103 and a smart bulb 104. The dock 101 interacts with the wireless controller 102 and consists of at least one low power module 105, which converts the current from AC to DC, and in a preferred embodiment is implemented by means of a Flyback type converter, such as depicted in FIG. 2. The low power module 105 energizes a charger module 106, shown in an embodiment in FIG. 3, which supplies power in a continuous and controlled manner to charge a battery of the wireless controller 102. The supply of power to the battery of the wireless controller 102 may be via wireless power transmission or by contact, such as with electrical connectors. The dock 101 may also comprise an additional low power module, which in an embodiment shown in FIG. 4 can comprise an oscillator that turns ON and OFF an output that allows to obtain energy from the electrical installation 103 when a non-smart bulb, incandescent, FCL or LED type bulb is connected to the smart home controller device. The dock 101 may comprise in one embodiment a high power module as the one shown in FIG. 5, which activates or deactivates the current flow through the non-smart bulb to control its turning ON, OFF and dimming.

The present invention takes advantage of the behavior of all smart bulbs, that is, to consume a small current continuously to keep their electronic circuitry functioning, even if the bulb is in its OFF state. The embedded power supply has a high efficiency so as not to waste energy and thus be able to supply the smart home controller device with the largest possible amount of energy.

Figure 6:
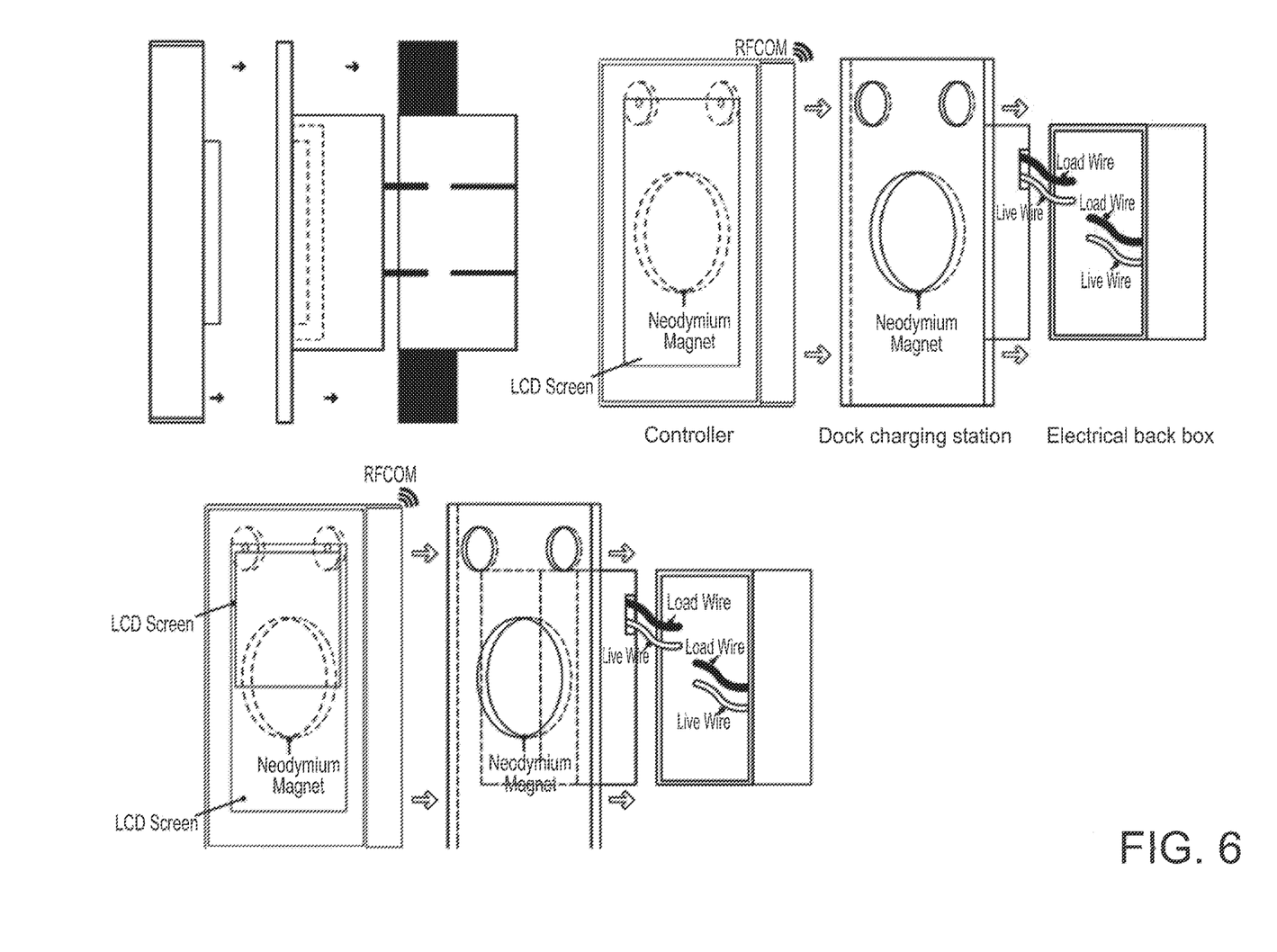
FIG. 6 shows exploded views of a preferred embodiment of the smart home controller device.
Figure 7:
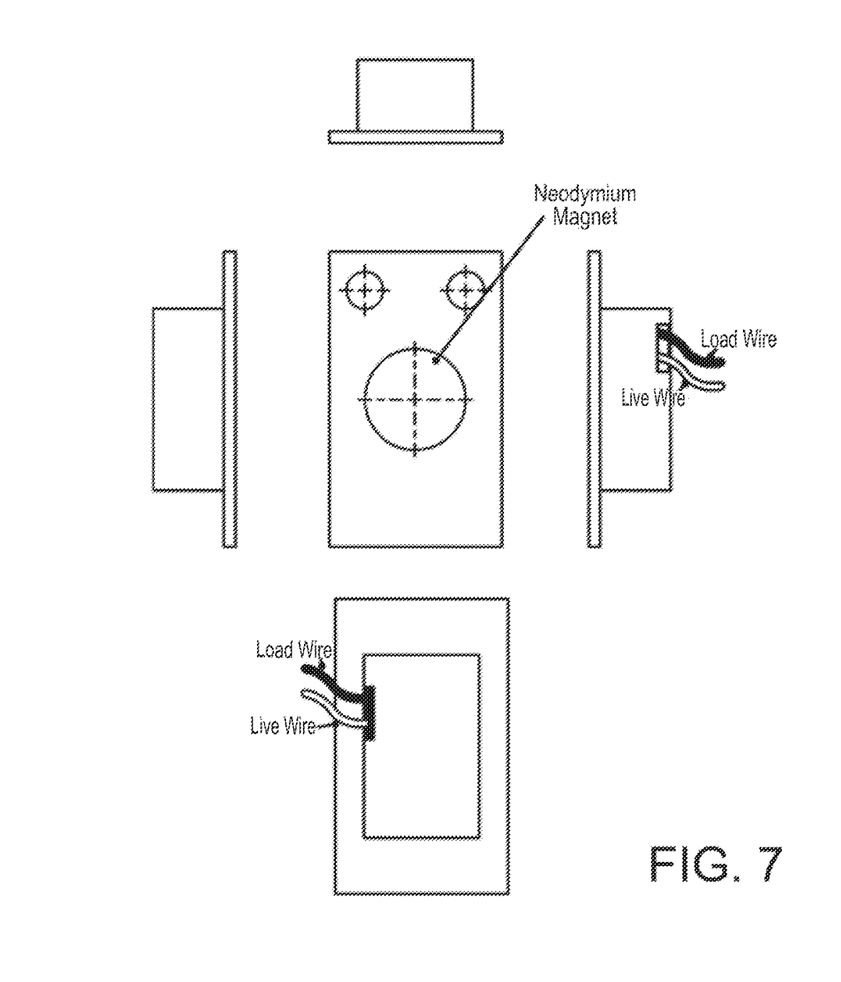
FIG. 7 shows isometric and perspective views of a preferred embodiment of the dock.
Figure 8:
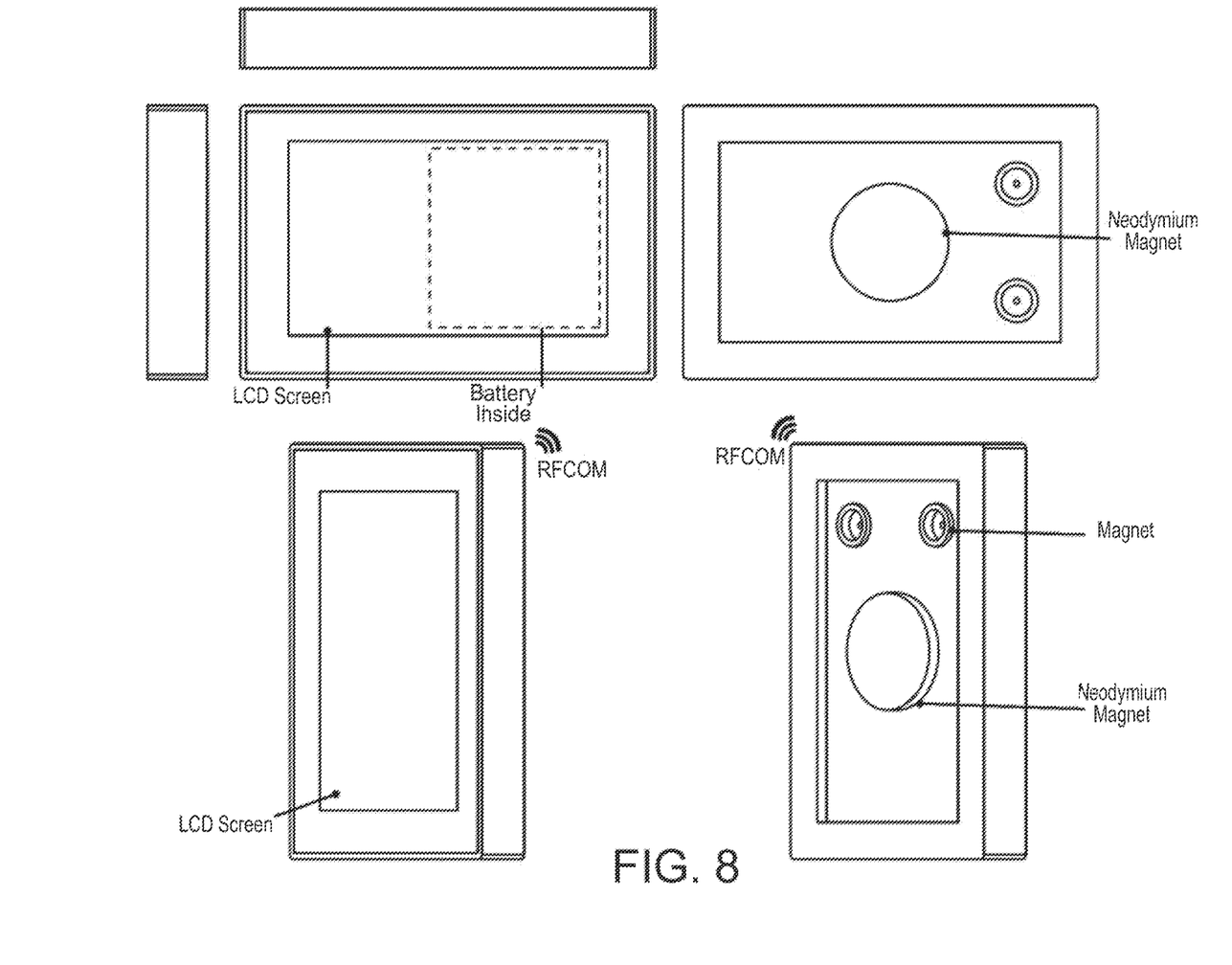
FIG. 8 shows isometric and perspective views of a preferred embodiment of the smart home controller device.

In a preferred embodiment shown in FIGS. 6, 7 and 8, the dock 101 is able to support and hold the wireless controller 102 by magnetic means. In a secondary embodiment, the wireless controller 102 can be hold to the dock 101 by clips means. When the wireless controller 102 is coupled to the dock 101, a DC voltage is supplied to the wireless controller 102, which is used to energize the same and to charge its internal battery. The wireless controller 102 contains smart electronics therein designed to charge in a stable and controlled way a battery that can be of the Ion-Lithium type, which is able to provide the wireless controller 102 with enough charge for a full day. The configuration of dock-controller has the advantage of allowing the user to remove the wireless controller 102 from the wall so that it can be used anywhere in the house without having to be wired. The wireless controller 102 can be much more advanced than existing controllers because it contains a battery with much more power than those used in state of the art smart home controllers, and can be recharged by being coupled back to the dock 101. Another important advantage is that the wireless controller 102 can have different configurations and embodiments, giving the user the flexibility to install different types of wireless controllers in the same dock on the electrical box, such as button panel, LCD touch screen and waterproof outdoor type controllers.

In a preferred embodiment, the wireless controllers 102 are able to talk to the smart appliances and home automation systems of the Smart home via Wi-Fi, Zigbee, Zwave, Nordic, Bluetooth, RF or any other type of communication. The wireless controllers 102 are removable so they can be used anywhere in the house. When the wireless controllers 102 need to recharge their internal battery, they must return to the docking station to recharge.

In a preferred embodiment, in case wireless controller 102 is not coupled to the dock 101, the latter will be able to control at all times turning On and Off bulbs to which it is connected. That is, the dock 101 controls turning On and Off of bulbs to which it is physically connected, independently of the wireless controller 102. This is very useful, because when the user is not able to find the wireless controller 102 or when it is not at his reach, such user may control turning On and Off the bulbs though the dock 101. This is possible since the dock 101 comprises a capacitive type touch sensor at the front part thereof. In case the wireless controller 102 is coupled to the dock 101, capacitive type touch sensor is covered and invalidated by such wireless controller 102, enabling now the bulb control by the wireless controller 102.

The wireless controller 102 may be a simple button board having buttons of capacitive type or a Tablet type screen (LCD touch screen), as depicted in FIG. 6. The wireless controller 102 may even be programmed through a mobile APP to configure a customized action on the capacitive buttons. The customized action may be turning ON or OFF a smart bulb in the network, control several smart bulbs at the same time or program scenes. It is important to mention that, since the wireless controller 102 will communicate wirelessly with the central control hub or internet router, it can control any smart bulb in the facilities in addition to the smart bulb to which the dock 101 is physically connected. In the wireless LCD touch screen type controller 102, a variety of different scenarios can be programmed through the screen and can even be used to obtain feedback from other bulb-controller systems and display information on the wall of the house.

The wireless controllers 102 are able to communicate with different smart home systems through the internet or locally through well-known communication protocols. For example, the wireless controller 102 could communicate with the Philips Hue™ central hub to be able to send commands to its system. As another example, it is possible to communicate through the internet with smart voice assistants, which can control the smart home systems.

Figure 9:
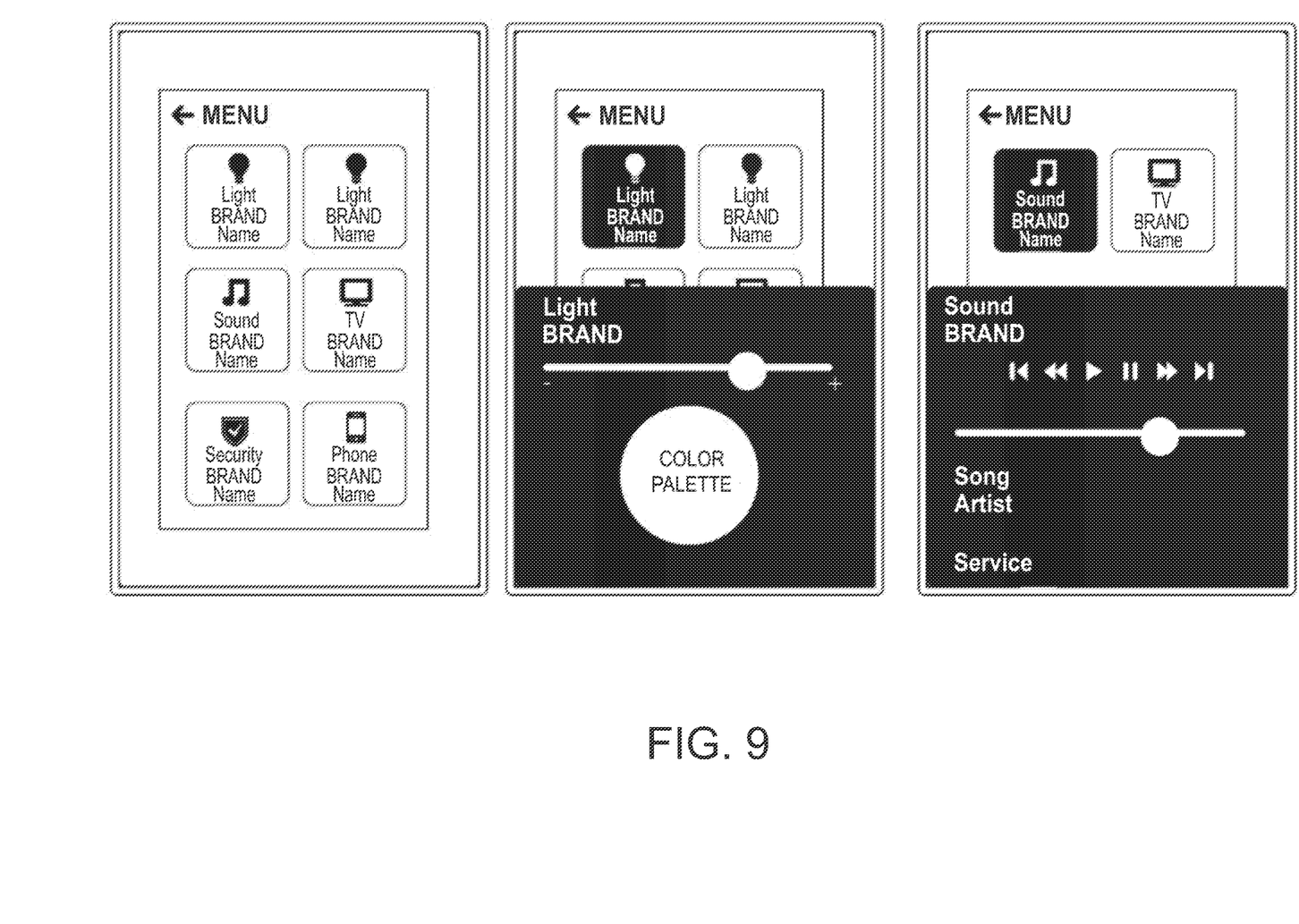
FIG. 9 shows frontal views of a preferred embodiment of the wireless controller's user interfaces.

As depicted in FIG. 9, wireless controllers 102 placed on the dock are able to run third party apps such as Apple HomeKit™ or Google Assistant™ and display information in real time from different sources, for example, receive weather information, stock market information and news information which can be displayed on the user's wall, or even play music, without needing to install a Tablet on the wall and have to change the electrical installation of the house.

In another embodiment, the screens of the wireless controllers 102, that include a high-fidelity microphone, can be used as means to perform videocalls through the house or even through the Internet. They can be used as an interphone to manage communication within the house too.

In another embodiment, the wireless controller 102 can be used as video intercom, wherein a real-time image can be displayed at the entrance of the house from a surveillance camera contained in the wireless controller 102. In a preferred embodiment, users will receive a notification, at their mobile handset and/or in other wireless controllers 102 of the house, indicating someone has ring the doorbell in the smart home. Additionally, wireless controllers 102 may be used as a closed-circuit television due to its surveillance cameras, as all wireless controllers 102 work as an internal security system. User, through an application, may select and see real-time images from the surveillance cameras contained in each wireless controller 102 within the smart home. In a secondary embodiment, by using wireless controllers 102 as an internal security system, these can be used to monitor babies and/or underage kids. In another secondary embodiment, the internal security system can communicate wirelessly with communication systems of security guards from residential estates.

The wireless controllers 102 can also be used to increase security with surveillance within a room by using the camera as a security camera, since they can transmit the image in real time to any device connected to the Internet.

Additionally, the high-fidelity microphone is on 24 hours a day to give the user a voice assistance service. That is, the controller has voice systems integrated such as Amazon Alexa™, Google Home™ or any other voice system that allows to provide such service. It is worth mentioning that wireless controllers 102 also may contain a motion sensor, humidity sensor, temperature sensor, in order to use this information to make the Smart home ecosystem smarter without using a neutral cable, thus enabling the installation of these sensors in a greater number of places.

In a secondary embodiment, the temperature sensor does not only work for the wireless controllers 102 to indicate the detected temperature, but also for the wireless controllers 102 to work as a smart thermostat. That is, the wireless controllers 102 are able to run third party home automation apps that control air conditioners as well as heating. Said third party home automation apps may be NEST™, Ecobee™ or any other application dedicated to control air conditioners as well as heating.

Furthermore, the wireless controllers 102 are able to run third party home automation apps such as Apple HomeKit™ or Google Assistant™, among others.

The smart home controller device is able to modify its user interface through the LCD screen of the wireless controllers 102. That is, the user can choose from an image database one image that matches with the interior design of the house to display it in the LCD screen of the wireless controllers 102 to make the system more aesthetic and interesting. A mobile application may be used to take a picture of the wall where the smart home controller device will be installed, and then the LCD screen is able to modify its user interface to display the same color as the wall, to have smart home controllers device with the same finishes and styles as the wall, to provide better aesthetics and integration with the smart home.

It is necessary to bear in mind that within the claim chapter the following terms are used:

Lighting device refers to a smart, non-smart, incandescent, FCL or LED type bulb;

Smart lighting device refers to a smart bulb;

Conventional lighting device refers to a non-smart, incandescent, FCL or LED type bulb.

It should be understood that the foregoing description is illustrative of the invention and should not be interpreted as limiting the invention. Those skilled in the art may create various modifications and applications without being isolated from the true spirit and scope of the invention as defined by the appended claims.

The invention claimed is:

1. A smart home controller device for controlling a lighting device, which operates with two wires of an electrical installation and can be installed in a standard electrical box, characterized in that comprises:
    a first low power module;
    a charger module;
    a second low power module;
    a high power module; and
    a wireless controller;
    wherein the first low power module is used when the lighting device is a smart lighting device, and energizes the charger module, which provides power to a battery of the wireless controller;
    wherein the wireless controller wirelessly sends and receives signals from the smart lighting device to control its operation and monitor its status;
    wherein the second low power module is used when the lighting device is a conventional lighting device, and provides power to the wireless controller when the lighting device is ON;
    wherein the high power module is used to control the switching ON, OFF and dimming of the conventional lighting device.

2. The smart home controller device of claim 1, wherein the smart home controller device is able to draw power from a smart, non-smart, incandescent, FCL or LED type bulb, uninterruptedly, regardless of whether a bulb is ON or OFF.

3. The smart home controller device of claim 1, wherein the wireless controller wirelessly sends and receives signals from the smart lighting device to control its operation and monitor its status independently of whether the smart lighting device is ON or OFF.

4. The smart home controller device of claim 1, wherein the charger module provides power in a continuous and controlled manner to the battery of the wireless controller.

5. The smart home controller device of claim 4, wherein the supply of power to the battery of the wireless controller is via wireless power transmission.

6. The smart home controller device of claim 1, wherein the wireless controller is supported and held by magnetic elements.

7. The smart home controller device of claim 1, wherein the wireless controller is supported and held by clips.

8. The smart home controller device of claim 1, wherein the first low power module is implemented by means of a Flyback type converter.

9. The smart home controller device of claim 1, wherein the second low power module comprises an oscillator.

10. The smart home controller device of claim 1, wherein the wireless controller can have different configurations including at least one of button panel, LCD touch screen, and waterproof outdoor type controllers.

11. The smart home controller device of claim 1, wherein the wireless controller sends a wireless signal to a central control hub or an internet router, in order to control the smart lighting device.

12. The smart home controller device of claim 11, wherein as the wireless controller communicates wirelessly with the central control hub or the internet router, it is able to control any smart lighting device in facilities in addition to the smart lighting device to which the smart home controller device is physically connected.

13. The smart home controller device of claim 1, wherein the wireless controller also contains at least one of a motion sensor, humidity sensor, temperature sensor, a surveillance camera, and/or a high-fidelity microphone.

14. The smart home controller device of claim 1, wherein the wireless controller is able to communicate with different smart home systems through the internet or locally through well-known communication protocols.

15. The smart home controller device of claim 14, wherein the wireless controller communicates through the internet with smart voice assistants, which controls the smart home systems.

16. The smart home controller device of claim 14, wherein a different smart home system is a central hub.

17. The smart home controller device of claim 14, wherein the wireless controller is used as means to perform videocalls through the smart house or even through the Internet.

18. The smart home controller device of claim 14, wherein the wireless controller is used as an interphone to manage communication within a smart house.

19. The smart home controller device of claim 14, wherein the wireless controller is used as video intercom, wherein a real-time image is displayed at the entrance of a smart house from a surveillance camera.

20. The smart home controller device of claim 14, wherein the wireless controller is used as closed-circuit television systems due to its surveillance cameras.

21. The smart home controller device of claim 1, wherein the wireless controller works as a smart thermostat.

22. The smart home controller device of claim 1, wherein the wireless controller is able to run third party apps.

23. The smart home controller device of claim 1, wherein the wireless controller displays information in real time.

24. The smart home controller device of claim 23, wherein said information comprises weather information, stock market information, and news information.

25. The smart home controller device of claim 1, wherein the wireless controller is able to play music.

\* \* \* \* \*